United States Patent [19]
Watanabe et al.

[11] Patent Number: 5,670,771
[45] Date of Patent: Sep. 23, 1997

[54] APPARATUS FOR READING A BAR CODE

[75] Inventors: Mitsuo Watanabe; Shinichi Sato; Ichiro Shinoda, all of Kanagawa, Japan

[73] Assignee: Fujitsu Limited, Kawasaki, Japan

[21] Appl. No.: 654,676

[22] Filed: May 29, 1996

[30] Foreign Application Priority Data

Sep. 5, 1995 [JP] Japan ................. 7-227822

[51] Int. Cl.⁶ ............................................. G06K 7/10
[52] U.S. Cl. ............................................. 235/462; 235/463
[58] Field of Search ............................. 235/462, 463

[56] References Cited

U.S. PATENT DOCUMENTS 5,453,604  9/1995  Narabu ........................... 235/462

*Primary Examiner*—Harold Pitts
*Attorney, Agent, or Firm*—Nikaido, Marmelstein, Murray & Oram LLP

[57] ABSTRACT

A DMA controller DMA-transfers a bar width data set generated by a bar width counter to an external RAM. The DMA controller simultaneously DMA-transfers the bar width data set written in the external RAM to an internal RAM. An MPU reads the bar width data set written in the internal RAM at a high speed and demodulates the read bar width data set between the reading processes.

7 Claims, 10 Drawing Sheets

APPARATUS FOR READING A BAR CODE

BACKGROUND OF THE INVENTION

1. Field of the Invention

The present invention relates generally to a bar code n reading apparatus for demodulating a bar width data read from a bar code and more particularly to a bar code reading apparatus capable of preventing the data from being left due to a reading failure.

2. Description of the Prior Art

A practice of managing commercial goods, etc. by using bar codes has been popularized in recent years as represented by a POS system in a distribution business, etc. For example, in the POS system of a store, such items of data as kinds, sales prices, etc. of the goods are encoded in a bar code format, and the encoded bar codes are printed on the goods, or seals printed with encoded bar codes are labeled on the goods. Then, the bar codes are read at a cash register, and the payment of the goods are cleared off based on the read data. The numbers of sales of the goods are added up in real time, which might be useful for stocking and purchasing managements.

The bar code reading apparatus for reading the bar code irradiates the bar code with scan light beams, detects variations in intensity of reflected light beams from the bar code and generates a bar width data corresponding to widths of respective bars constituting the bar code. Then, the thus generated bar width data are sequentially transferred to a processor (which is an MPU), wherein the bar width data are demodulated into the data which had been encoded in the bar code.

Figure 10:
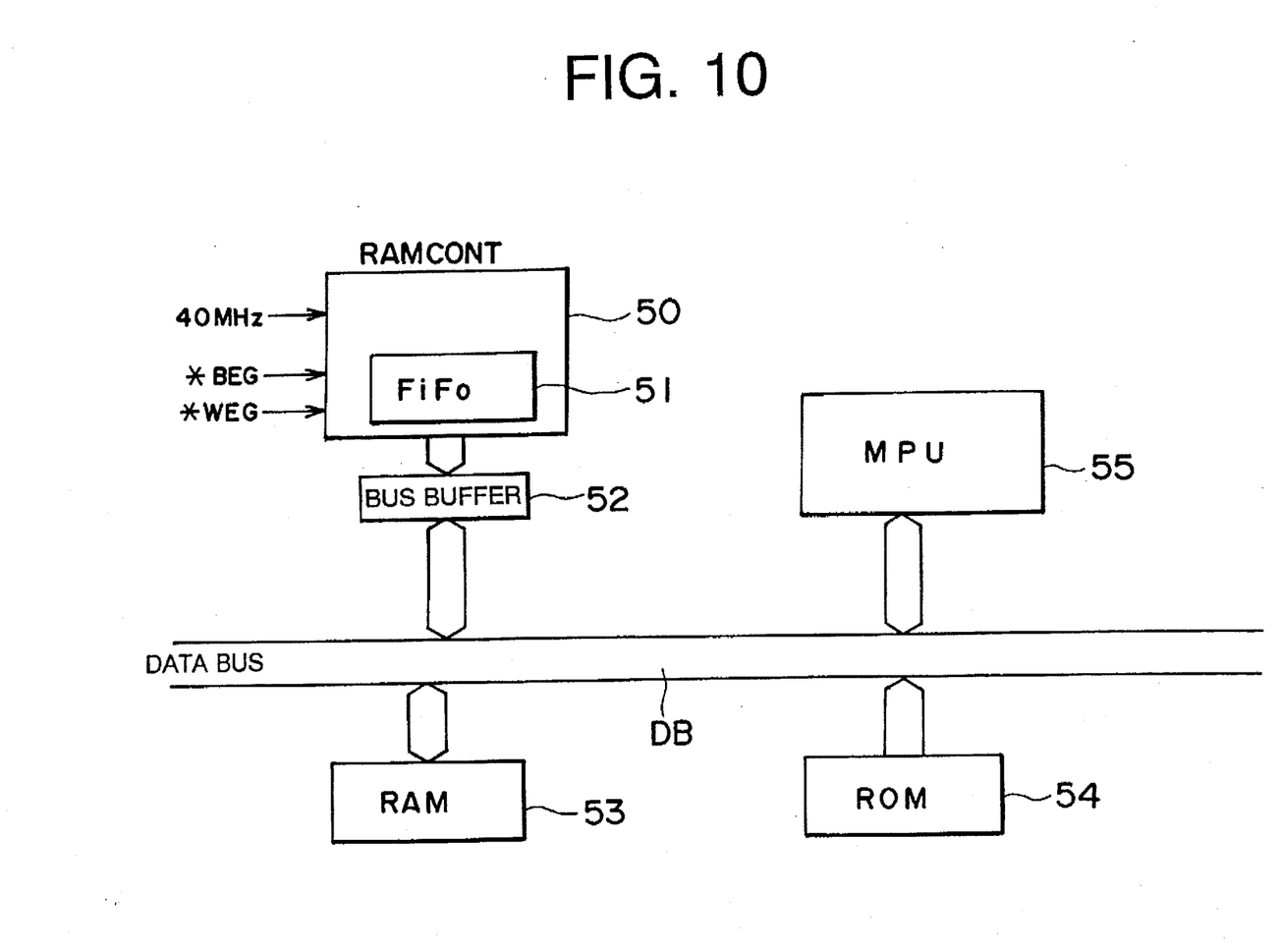
FIG. 10 is a block diagram showing a detailed configuration of a conventional bar code recognizing/demodulating circuit.

FIG. 10 illustrates principal units of the bar code reading apparatus, which executes a series of processes described above. Referring to FIG. 10, a bar width counter (RAMCONT) 50 receives signals (BEG and WEG) indicating variations in intensity of the reflected light beams that are detected by a light receiving device (not shown), and of clock pulses (40 MHz). The bar width counter 50 generates count values of the clock pulses from the bar width data indicating the respective bar widths on the basis of those signals. The bar width counter 50 then outputs the count values to an external bus buffer 52 via a FIFO (first-in first-out) memory 51 provided therein.

This bus buffer 52 is connected to a data bus DB. Connected to this data bus DB are an external RAM 53, a ROM 54 and an MPU 55 in addition to the bus buffer 52. The MPU 55 is a processor for demodulating the bar width data. The ROM 54 is stored with a control program executed by the MPU 55.

Then, the bar width data within the bus buffer 52 are transferred and accumulated in the external RAM 53 under the control of the MPU 55. The MPU 55 sequentially reads the bar width data accumulated in the external RAM 53. Then, each time a set of four pieces of bar width data (corresponding to one character in a WPC code, etc.) are read, the set of four pieces of bar width data read are demodulated into corresponding data. Subsequently, upon a completion of the demodulation process for the thus read bar width data set, the bar width data are again transferred from the bar width counter 50 to the external RAM 53.

Since the external RAM 53 is connected via the data bus DB to the MPU 55, however, it takes too much time to transfer the bar width data to the MPU 55 from the external RAM 53. Consequently, there arises such a problem that some data are left due to a reading failure during the demodulation process. This will be explained with reference to FIG. 11.

Figure 11:
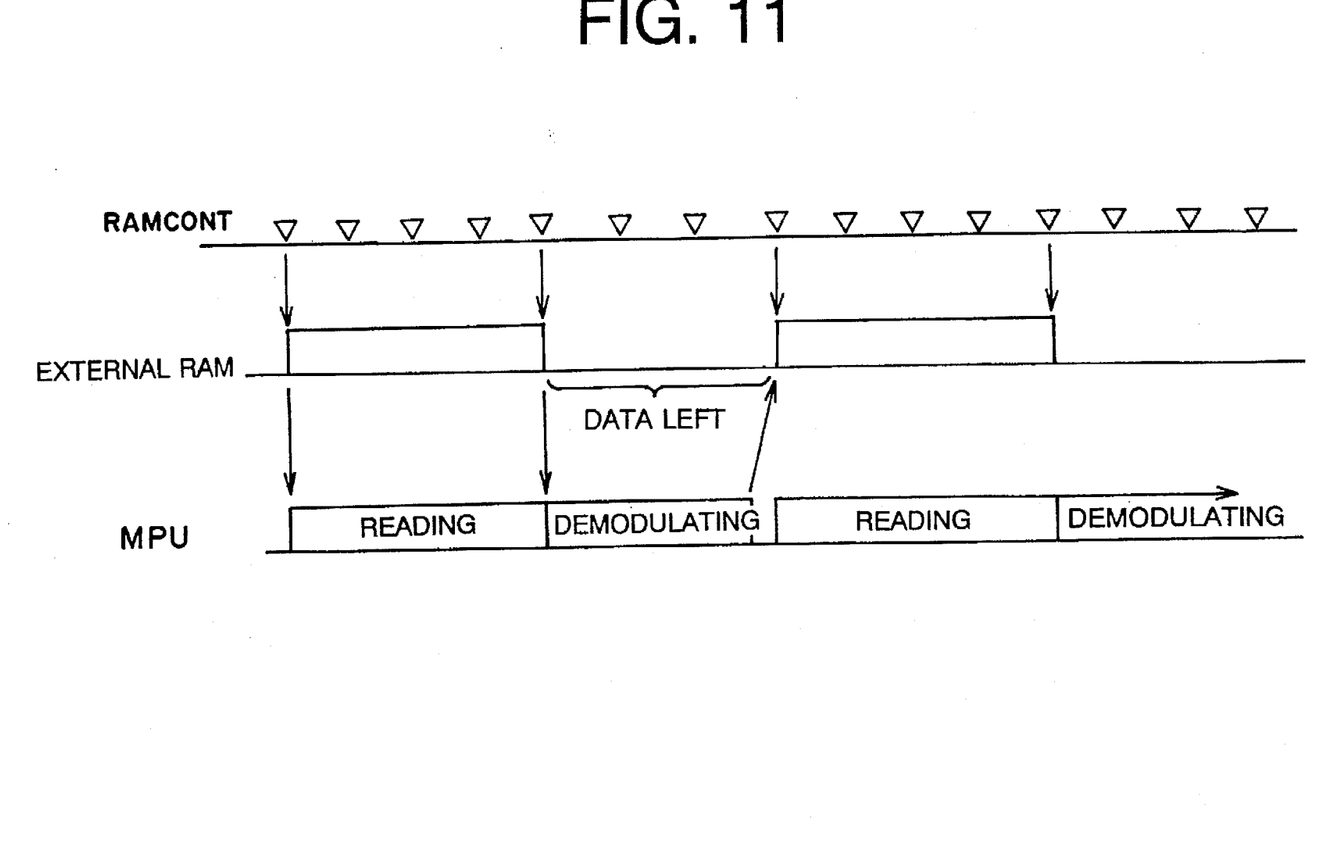
FIG. 11 is an explanatory diagram showing how the bar width data are prevented from being left due to the reading failure.

FIG. 11 is time chart showing statuses of signals of the bar counter (RAMCONT) 50, the external RAM 53 and the MPU 55. A uppermost portion in FIG. 11 shows the signal status of the bar width counter, wherein a symbol of an inverted triangle represents a generation of the bar width data. To begin with, in order to completely transfer all the four pieces of bar width data constituting one character to the external RAM 53, the bar width counter 50 must wait for a completion of generation of all four pieces of bar width data. It also takes much the same time as for the transferring for the MPU 55 to read the four pieces of bar width data from the external RAM 53, since a data transfer speed on the data bus DB is substantially equal to a bar width data generation speed in the bar width counter 50.

Accordingly, it follows that a time necessary for the MPU 55 to perform the processes on the one-character bar width data set including the time taken for the demodulation executed immediately after reading the bar width data set becomes larger than a time required for generating the one-character bar width data set by the bar width counter 50. Consequently, the bar width data set generated during the time difference between the processing and the generating are left without being read by the MPU 55. Further, even when the data transfer speed on the data bus DB is slightly higher than the bar width data generation speed in the bar width counter 50, and if it takes too much time to perform the demodulation process, the data are similarly left due to the reading failure (which is a first problem).

Moreover, even if the entire capacity of the bar code apparatus is made large with a plurality of external RAMS 53, the MPU 55 might be capable of reading all the data without being left due to the reading failure. If the series of bar width data sets corresponding to a single set of bar code are stored astride in the plurality of RAMs, however, a demodulation cycle in the MPU 55 deviates, and it is therefore impossible to demodulate the bar width data into the original data (which is a second problem).

SUMMARY OF THE INVENTION

It is a first object of the present invention, which was contrived to overcome the first problem, to provide a bar code reading apparatus capable of demodulating a bar code which can prevent bar width data from being left due to a reading failure.

It is a second object of the present invention, which was contrived to overcome the second problem, to provide a bar code reading apparatus capable of consecutively transferring a series of bar width data without segmenting the bar width data.

To accomplish the first object, according to a first aspect of the present invention, a bar code reading apparatus comprises a bar width data generating unit for detecting widths of respective bars of a bar code and generating bar width data corresponding to the widths of the respective bars. The bar code reading apparatus also comprises a low-speed memory to which the bar width data generated by the bar width data generating unit are transferred, and a high-speed memory to which the bar width data transferred to the low-speed memory are further transferred. The bar code reading apparatus further comprises a demodulation device for reading the bar width data transferred to the high-speed memory and demodulating the bar width data into corresponding data.

The bar width data generating unit, the low-speed memory and the high-speed memory may be connected to each other via a data bus. The high-speed memory may be connected directly to the demodulation device. With this construction, the bar width data are transferred from the low-speed memory to the high-speed memory via the data bus, and therefore a data transfer speed becomes low. In contrast with this, the bar width data are read from the high-speed memory to the demodulation device at a high speed because of the high-speed memory and the demodulation device being connected directly to each other.

The bar code reading apparatus of the present invention may further comprise a transfer control unit for controlling the transfer of the bar width data from the bar width data generating unit to the low-speed memory and the transfer from the low-speed memory to the high-speed memory. With this construction, the transfer control unit controls both of the data transfers, and the data can be transferred with a high efficiency by grasping states of the respective components.

The low-speed memory may have a capacity larger than that of the high-speed memory. With this construction, even if there is no alternative but to reduce the capacity of the high-speed memory, the bar width data successively outputted from the bar width data generating unit are held without being left due to the reading failure.

The transfer control unit may divide plural pieces of bar width data stored in the low-speed memory into plural pieces in such a manner that a quantity of the divided data is smaller than a capacity of the high-speed memory, and may transfer the plural pieces of the divided data to the high-speed memory through a plurality of transfer processes. Thus dividing and transferring the bar width data, the transfer control unit is capable of, even if the capacity of the high-speed memory is smaller than that of the low-speed memory, transferring the bar width data without being left due to the reading failure.

The transfer control unit may make such an arrangement that the tail end part of the piece of the divided data to be transferred in each transfer process is included in a head of the pieces of the divided data to be transferred in a next transfer process. With this arrangement, even when dividing the plural pieces of bar width data stored in the low-speed memory into plural pieces of data, it is possible to avoid such a state that the series of bar width data positioned at the end of the piece of the data is subdivided enough to make the data impossible of demodulation. The second problems described above can be thereby obviated.

In the case where the trail end part of the piece of the divided data to be transferred in each transfer process is included in the head of the piece of the divided data to be transferred in the next transfer process, the transfer control unit may set a quantity of the tail end part of the piece of the divided data to be transferred in each transfer process larger than a quantity of the bar width data corresponding to a segment from the leading end to the trailing end of a single bar code.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

Next, an embodiment of the present invention will hereinafter be discussed with reference to the accompanying drawings.

(Principle of the Embodiment)

Figure 1:
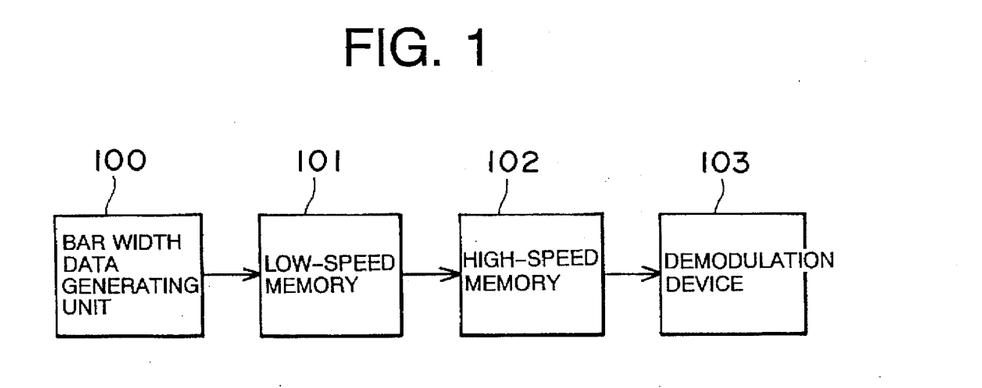
FIG. 1 is a diagram showing the principle of a bar code reading apparatus in an embodiment of the present invention.

FIG. 1 is a block diagram schematically showing the principle of a bar code reading apparatus in one embodiment of the present invention. Referring to FIG. 1, a bar width data generating unit 100 detects widths of respective bars constituting a bar code to be read and generates pieces of bar width data corresponding to the individual bar widths. The bar width data generated by the bar width data generating unit 100 are temporarily transferred to a low-speed memory 101. The bar width data transferred to the low-speed memory 101 are further transferred to a high-speed memory 102. A demodulation device 103 reads the bar width data at a high speed, which have been transferred to the high-speed memory 102, and demodulates the read bar width data into corresponding data. Accordingly, time required for completing the demodulation since the bar width data are read from the high-speed memory 102 may be shorter than time needed for transferring the same quantity of bar width data to the low-speed memory 101 from the bar width data generating unit 100. While the bar width data generating unit 100 transfers a fixed quantity of bar width data to the low-speed memory 101, it is therefore possible for the demodulation device 103 to demodulate the same quantity of bar width data read from the high-speed memory 102. Consequently, the data can be prevented from being left due to a reading failure.

(Whole Construction of Bar Code Detecting Apparatus)

Figure 2:
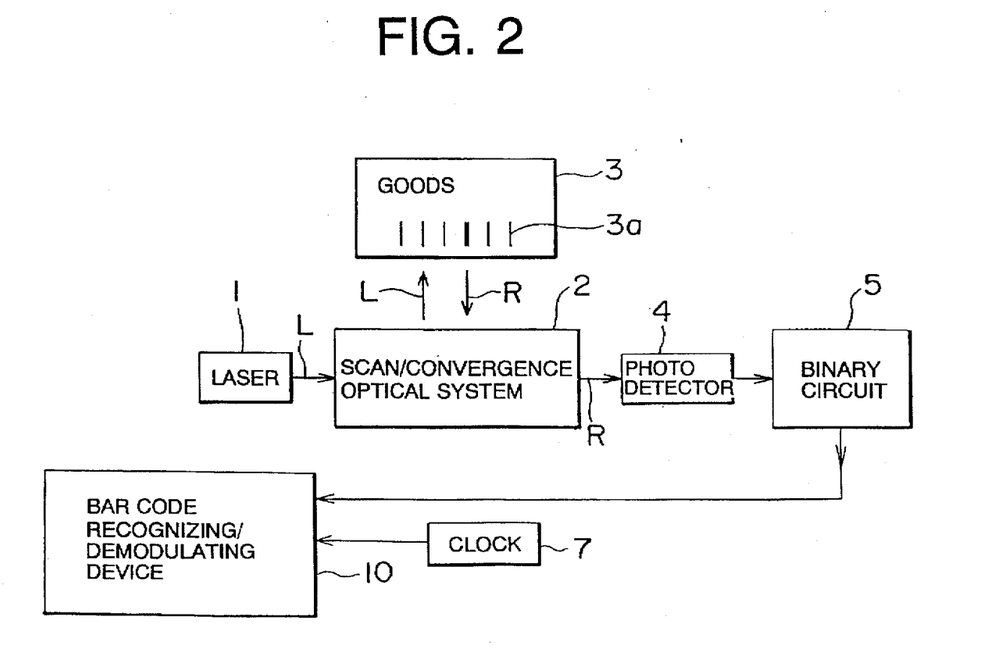
FIG. 2 is a block diagram illustrating the bar code reading apparatus in an embodiment of the present invention.

FIG. 2 is a block diagram schematically illustrating a construction of the bar code reading apparatus in one embodiment of the present invention.

Referring to FIG. 2, a laser light source 1 is a semiconductor laser for emitting laser beams L. The laser beams L emitted from the laser light source 1 are incident upon a scan/convergence optical system 2. The scan/convergence optical system 2 deflects the laser beams L with a polygon mirror and reflecting the thus deflected laser beams L in a variety of directions by use of a plurality of fixed mirrors.

The scan/convergence optical system 2 performs scanning with the laser beams in the plurality of directions upward from this scan/convergence optical system 2 within a period (from a timing when the laser beams L start to be made incident on one reflection surface till a timing when the laser beams come off the same surface) of the deflection by one reflection surface of the polygon mirror. When the scanning laser beams L strike on the surface of a goods 3, the laser beams L are irregularly reflected from the surface, and some of reflected beams R return to the scan/convergence optical system 2. The scan/convergence optical system 2 relays the reflected beams R to a photo detector 4. The photo detector 4 is a photo diode covered with a filter that transmits only the light beams having the same wavelength as that of the laser beams L. The photo detector 4 inputs an electric current corresponding to an intensity of the reflected beams R to a binary circuit 5.

The binary circuit 5 converts a value of the electric current inputted from the photo detector 4 into a value of voltage. The binary circuit 5 then compares the converted voltage value with a predetermined threshold value to shape it into a square wave signal. This square wave signal indicates "H" level if an intensity of the reflected beams R corresponds to a reflectance of a white bar in a bar code 3a labeled on the goods 3. The square wave signal also indicates "L" level if the intensity of the reflected beams R corresponds to a reflectance of a black bar in the bar code 3a. The binary circuit 5 detects each of a rise (which is a white edge) and a fall (which is a black edge) of the square wave signal. The binary circuit 5 then outputs a white edge pulse (WEG) synchronizing with the white edge and also a black edge pulse (BEG) synchronizing with the black edge.

Figure 3:
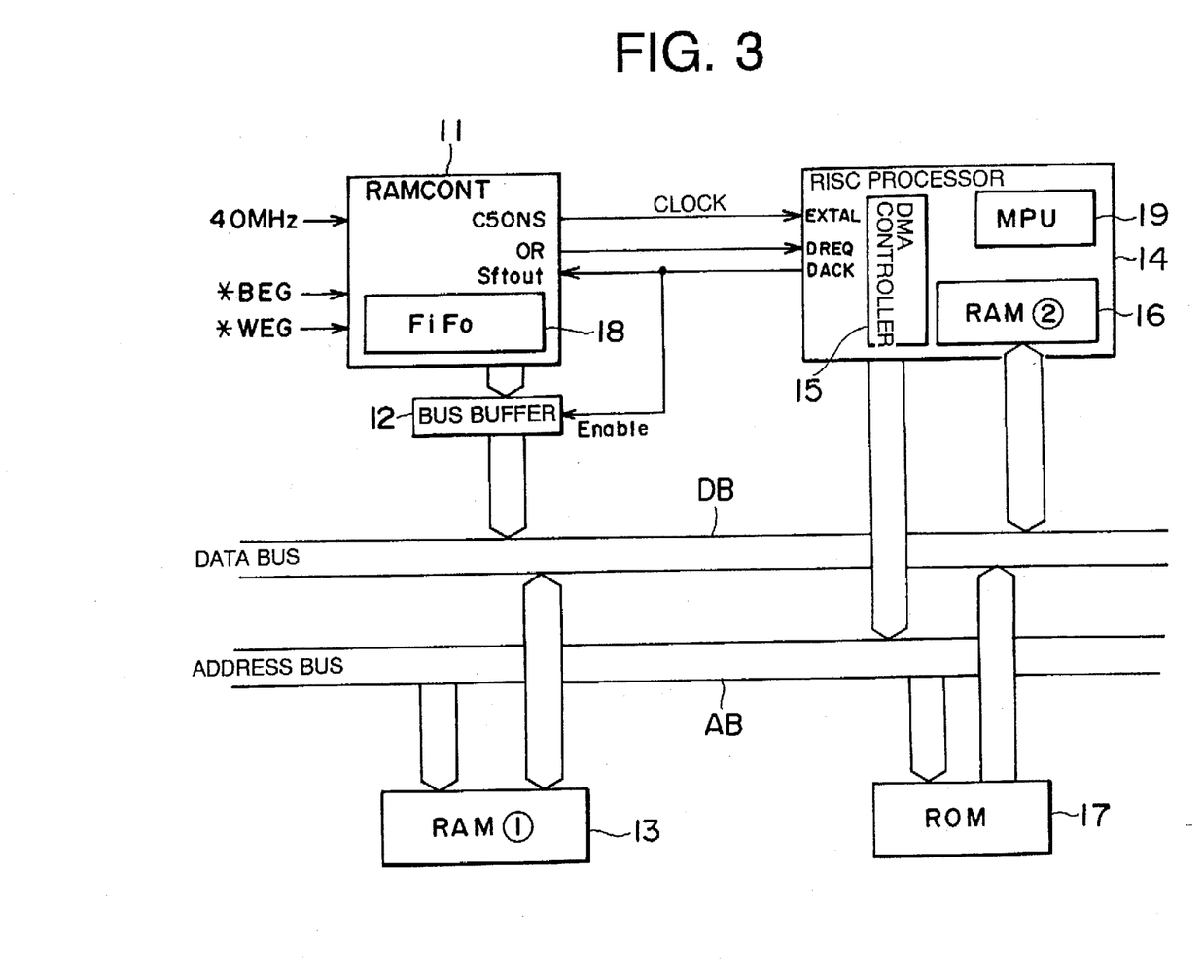
FIG. 3 is a block diagram illustrating a detailed configuration of a bar code recognizing/demodulating circuit shown in FIG. 2.

Those white edge pulses (WEG) and black edge pulses (BEG) are inputted to a bar code recognizing/demodulating device 10 which demodulates the data encoded into the bar code 3a on the basis of the above pulses. Clock pulses (40 MHz) are inputted from a clock 7 to the bar code recognizing/demodulating device 10. FIG. 3 illustrates a specific configuration of the bar code recognizing/demodulating apparatus 10.

Referring to FIG. 3, the above-mentioned white edge pulses (WEG), the black edge pulses (BEG) and the clock pulses (40 MHz) are inputted to a bar width counter (RAMCONT) 11. This bar width counter 11 is connected via a bus buffer 12 to a data bus DB. Connected to this data bus DB are an external RAM (RAM G) ①  13, a ROM 17 and an internal RAM (RAM ①) of an RISC processor 14. The external RAM 13, the ROM 17 and the RISC processor 14 are connected to each other via an address bus AB. The following is an detailed explanation of configuration thereof.

The above-mentioned bar width counter 11 includes two pieces of output terminals (which are designated by C50ns and OR) and one piece of input terminal (which is shown by Sftout). The output terminal C50ns among those terminals serves to supply the clocks to an input terminal EXTAL of the RISC processor 14.

This bar width counter 11 measures a time (which is expected to be a time corresponding to a width of the white bar in the bar code 3a) from a timing of the white edge pulse (WEG) to a timing of the black edge pulse (BEG). The bar width counter 11 also measures a time (which is expected to be a time corresponding to a width of the black bar in the bar code 3a) from the timing of the black edge pulse (BEG) to the timing of the white edge pulse (WEG). Note that the bar width counter 11 counts the number of clocks from the clock 7 to measure the time corresponding to each of those bar widths and generates count values (which are herein below called "bar width data") corresponding to the bar widths. Thus, the laser light source 1, the scan/convergence optical system 2, the photo detector 4, the binary circuit 5 and the bar with counter 11 are combined to constitute a bar width data generating unit for generating the bar width data corresponding to the respective bar widths by detecting the widths of the individual bars constituting the bar code.

Further, the bar width counter 11 has a built-in FIFO memory circuit 18. The FIFO memory circuit 18 is a first-in first-out memory for temporarily holding the generated bar width data and outputting the bar width data in sequence of the holding. The bar width counter 11 stores the FIFO memory circuit 18 with the generated bar width data each time the generation of each piece of bar width is completed. The bar width counter 11 transmits a transfer request signal (DREQ) to the RISC processor 14 via an output terminal OR. Then, when the RISC processor 14 (i.e., a DMA controller 15) transmits a transfer request acceptance signal (DACK) in response to the transfer request signal (DREQ), the bar width counter 11 receives this transfer request acceptance signal (DACK) via the input terminal (Sftout) and outputs to the bus buffer 12 the bar width data stored in the FIFO memory circuit 18.

The bus buffer 12 is a buffer which treats the transfer request acceptance signal (DACK) as an enable signal. The bus buffer 12 enables itself to pass the bar width data outputted from the bar width counter 11 toward the data bus DB when receiving the transfer request acceptance signal (DACK).

The external RAM 13 includes areas into which the data from the data bus DB is written according to the write address designated by an address bus AB. The data written to an area corresponding to a read address designated by the address bus AB is read toward the data bus DB. Thus, the external RAM 13 transfers and receives the data to or from other devices via the data bus DB, so that the external RAM 13 can transfer and receive the data only at a low speed. Hence, the external RAM 13 is defined as a "low-speed memory". The external RAM 13 has, however, a large capacity (as large as 3584 words).

The RISC processor 14 is a processor including an MPU (which is a microprocessor) 19, an internal RAM (RAM ②) 16, a DMA (direct memory access) controller 15 and an I/O (input/output) unit (which is not shown) which are packaged in one chip.

The internal RAM 16 is an internal memory connected directly to the MPU 19. The MPU 19 is thus connected directly to the internal RAM 16, so that the MPU 19 is therefore capable of reading the data from the internal RAM 16 at a high speed (which may be expressed by zero weight). Accordingly, the internal RAM 16 is defined as a "high-speed memory". Note that the capacity of the internal RAM 16 is small (as small as 512 words) because of its speed. Therefore, in accordance with this embodiment, the external RAM 13 having the large capacity is provided for preventing the data from being left due to the reading failure in the internal RAM 16.

The DMA controller 15 serving as a transfer controlling unit outputs the transfer request acceptance signal (DACK) in response to the transfer request signal (DREQ) received from the bar width counter 11. The DMA controller 15 also outputs a write address on the external RAM 13 to the address bus AB in order to write the bar width data outputted from the bar width counter 11 to the external RAM 13 in response to the transfer request acceptance signal (DACK). Thus, the DMA controller 15 transfers the bar width data to the external RAM 13 from the bar width counter 11 in a single address mode.

Further, the DMA controller 15 transfers a bar width data set written to the external RAM 13 to the internal RAM 16 in accordance with a dual address mode. More specifically, the DMA controller 15 repeats a reading cycle and a writing cycle for every word (which is defined as a unit of data transferrable with one clock via a 32-bit parallel data bus DB). Then, the DMA controller 15 designates a read address to access the external RAM 13, at the reading cycle, and designates a write address to access the internal RAM 16, at the writing address.

Note that the bus mode used by the DMA controller 15 for the DMA transfer described above is a cycle still mode. To be more specific, there is repeated such a cycle that the DMA controller 15 temporarily returns a right of bus to the MPU 19 each time the transfer of one-word is finished, and taken back the right of bus for transferring next one word. When the DMA controller 15 simultaneously executing the DMA transfers from the bar width counter 11 to the external RAM 13 and the DMA transfer from the external RAM 13 to the internal RAM 16, it executes these transfers alternately per word.

The MPU 19 serving as the demodulation device controls the whole bar code recognizing/demodulating device 10 by executing a control program stored in the ROM 17. The MPU 19 sequentially reads the bar width data from the internal RAM 16 and, based on a set of the thus read bar width data, demodulates the data encoded into the bar code. An algorithm of the demodulation is that the data (in the form of numerals) corresponding to combinations of widths of the respective bars constituting characters are read from a table for every character composed of two white bars and two black bars that are alternately consecutive in the case the bar code 3a conforms to a WPC code format, and then the character is converted into this item of data.

(Content of Control)

Figure 4:
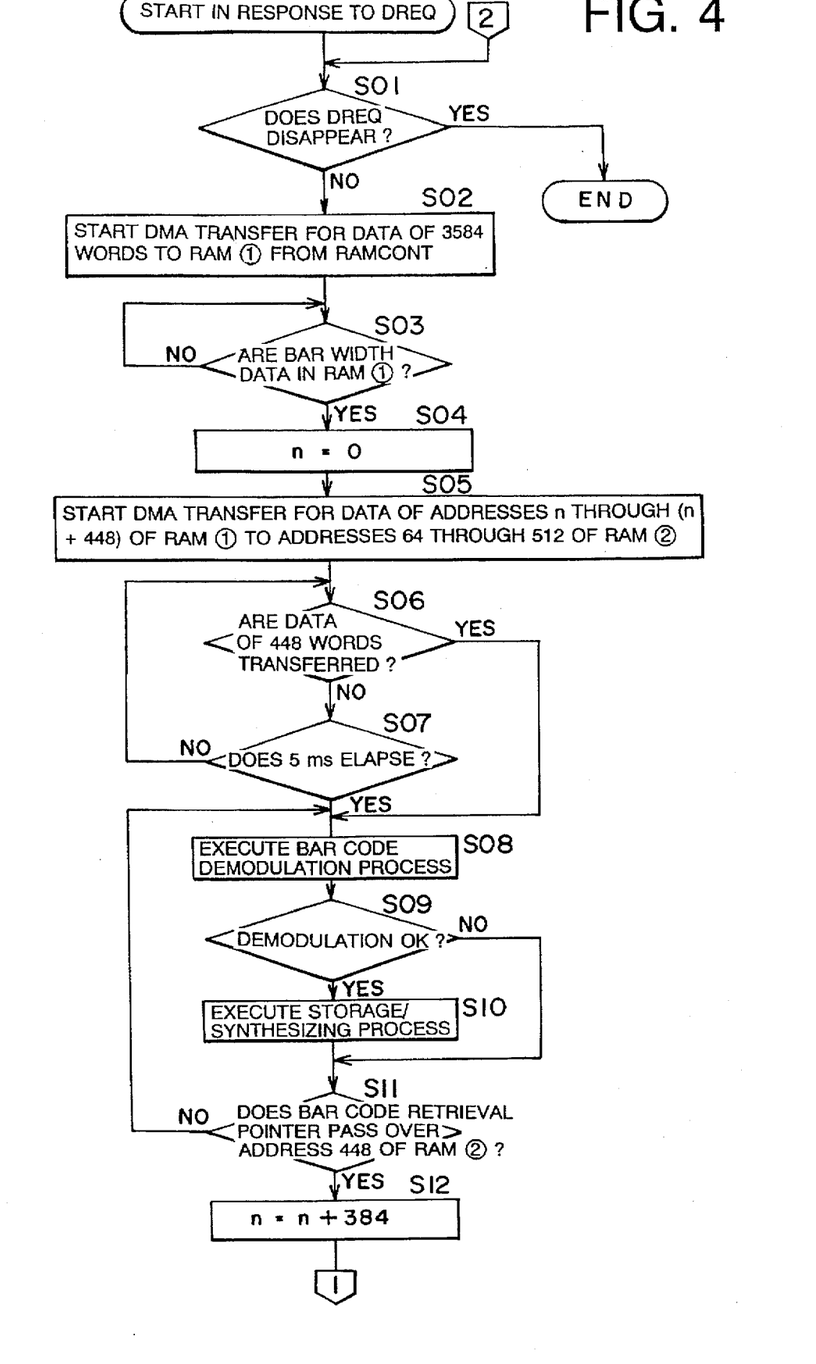
FIG. 4 is a flowchart showing a DMA transfer process executed by a DMA controller shown in FIG. 3.
Figure 5:
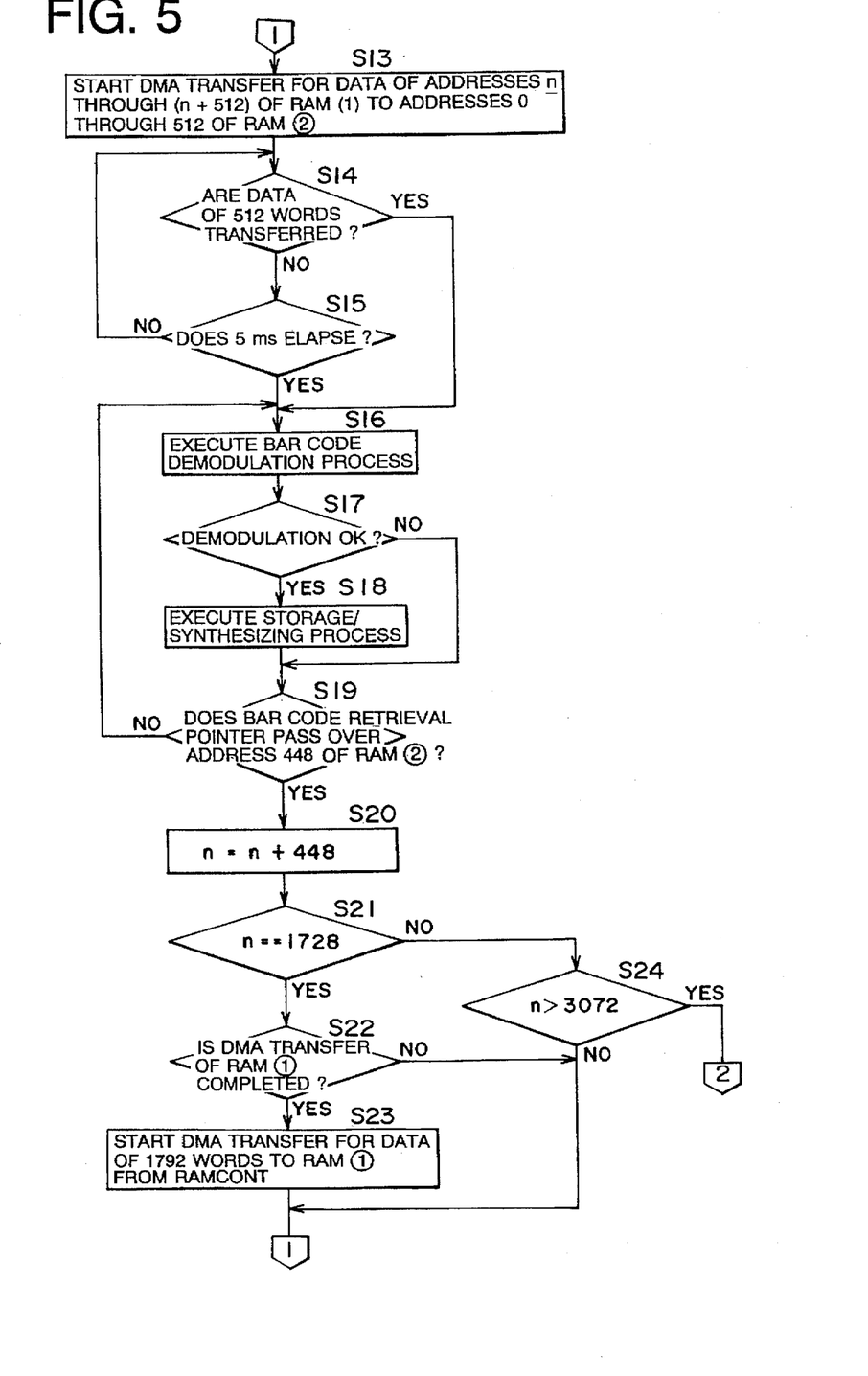
FIG. 5 is a flowchart showing the DMA transfer process executed by the DMA controller shown in FIG. 3.

Next, a content of DMA transfer control executed by the DMA controller 15 is explained with reference to flowcharts of FIGS. 4 and 5. Processes shown in FIG. 4 start with receiving the transfer request signal (DREQ) from the bar width counter 11. Checked in first step S01 is whether the transfer request signal (DREQ) disappears. This check is performed to stop this processes in the course of a loop process (see a connector 2) of after first cycle.

Figure 6:
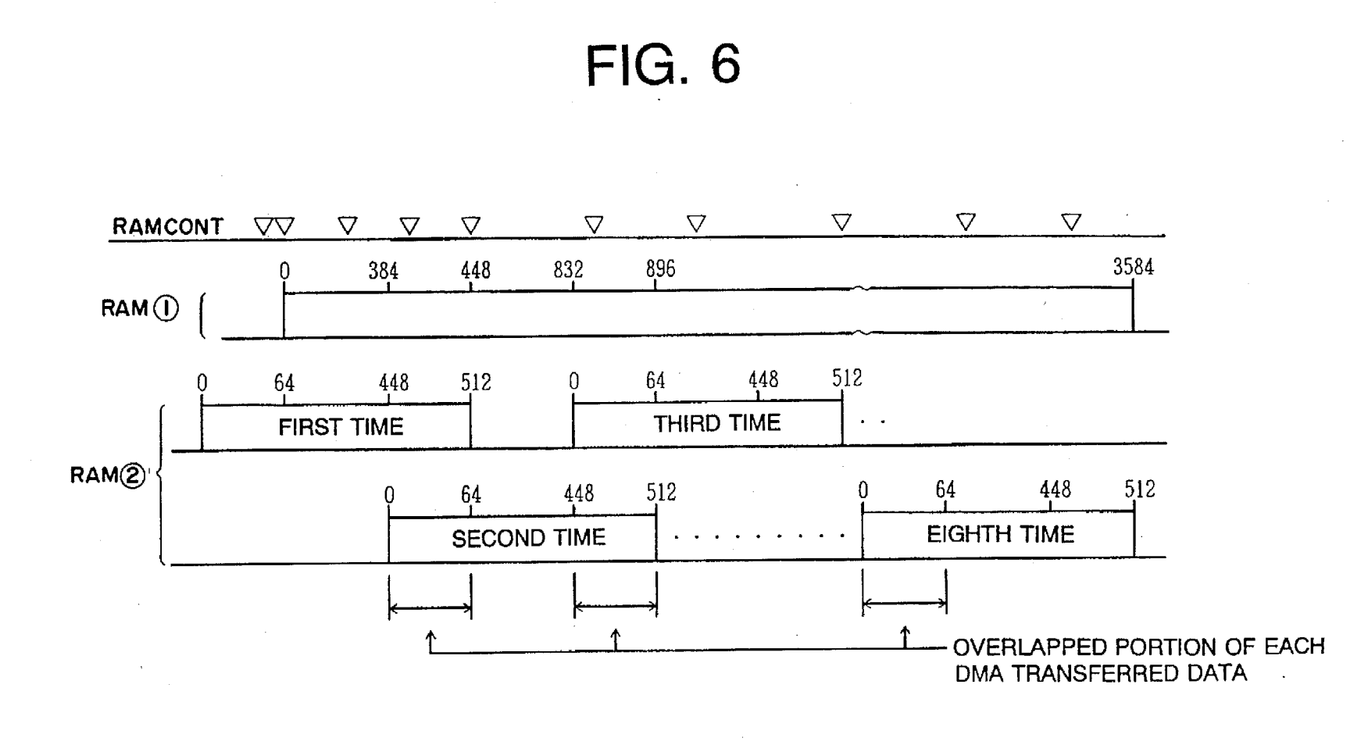
FIG. 6 is an explanatory diagram showing the DMA transfer.

If the transfer request signal (DREQ) does not yet disappear, the DMA controller 15 starts DMA-transfer for the bar width data of 3584 words from the bar width counter 11 to the external RAM 13 in the cycle still mode (which is a single address mode) in step S02 (see RAM (1) shown in FIG. 6). Then, while the DMA controller 15 continues the same DMA transfer till all the bar width data are transferred, it advances the processing to step S03.

Checked in step S03 is whether there are any untransferred bar width data in the external RAM 13. Then, when there is a bar width data written in the external RAM 13 as a result of the DMA transfer executed in step S02, the processing proceeds to step S04.

In step S04, a variable $\underline{n}$ is reset to "0".

In next step S05, the bar width data set written in an area of the external RAM 13 corresponding to an address $\underline{n}$, that is "0", through an address (n+448), that is "448", is DMA-transferred in the cycle still mode (which is the dual address mode). The same bar width data set is written to an area of the internal RAM 16 corresponding to an address "64" through an address "512" (see the "first time" of RAM ② shown in FIG. 6).

Checked in next step S06 is whether the DMA transfer for the data of 448 words (corresponding to the addresses "64" through "512" of the internal RAM 16) from the external RAM 13 to the internal RAM 16 is completed. Then, if the DMA transfer for the data of 448 words is completed, the processing proceeds directly to step S08. Whereas if the data of 448 words are not yet transferred, there must be a possibility that the generation of the bar width data by the bar width counter 11 is delayed or that the DMA transfer from the bar width counter 11 to the external RAM 13 is delayed. Then, in step S07, the processing is returned to step S06 till 5 ms elapses. Only if the transfer for the data of 448 words is completed (step S06), or if the bar width data are not consecutively written to the external RAM 13 for 5 ms (step S07), the processing proceeds to step S08.

In step S08, the MPU 19 is instructed to demodulate the bar code, and a termination of this bar code demodulation process is waited. Note that the MPU 19, in this bar code demodulation process, reads bar width data stored in the respective addresses within the internal RAM 16 in an address sequence at a high speed. Then, the MPU 19 demodulates four pieces of bar width data each time the four pieces of bar width data constituting each character are read, and converts the thus read data into corresponding data.

Checked in next step S09 is whether a result of the bar code demodulation process in step S08 is good or bad. Then, if the result of the process is good, that is, if the four pieces of bar width data are converted into the corresponding data, in step S10, the internal RAM 16 is stored with the thus converted data, and the data corresponding to the entire bar code are synthesized based on pieces of data converted so far. The processing then proceeds to step S11. Contrastingly if the result of the process is bad, that is, if the four pieces of bar width data are not converted into the corresponding data, the processing proceeds directly to step S11.

Checked in step S11 is whether a bar code retrieval pointer passes over the address "448" of the internal RAM 16. This bar code retrieval pointer is a pointer scanning areas of the internal RAM 16 in the address sequence from the address "0" at the same velocity as the speed of the DMA transfer from the bar width counter 11 to the external RAM 13 each time the DMA transfer to the internal RAM 16 is completed. The processing is returned to step S08 till the bar code retrieval pointer passes over the address "448". If the bar code retrieval pointer passes over the address "448" of the internal RAM 16 as a consequence of repeating the loop process of the step S08 through step S11, the processing moves forward to step S12.

In step S12, "384" is added to the variable n "0".

In next step S13, the bar width data set written to the area according to an address $\underline{n}$ through an address (n+512) of the external RAM 13 is DMA-transferred in the cycle still mode (which is the dual address mode) to be written to the address "0" through the address "512" of the internal RAM 16. In the case of, e.g., the second DMA transfer, the bar width data set written to the area of the external RAM 13 corresponding to the address "384" through the address "896" is transferred to the area of the internal RAM 16 corresponding to address "0" through the address "512" (see the "second time" of the RAM ② shown in FIG. 6).

Checked subsequently in next step S14 is whether the DMA transfer for the data of 512 words is completed. If the DMA transfer for the data of 512 words is completed as a result of checking, the processing proceeds directly to step S16. Whereas if the data of 512 words are not yet transferred, there must be a possibility that the generation of the bar width data by the bar width counter 11 is delayed or that the DMA transfer from the bar width counter 11 to the external RAM 13 is delayed. Then, in step S15, the processing is returned to step S14 till 5 ms elapses. Only if the transfer for the data of 512 words is completed (step S14), or if the bar width data are not consecutively written to the external RAM 13 for 5 ms (step S15), the processing proceeds to step S16.

In step S16, the MPU 19 is instructed to demodulate the bar code, and a termination of this bar code demodulation process is waited.

Checked in next step S17 is whether a result of the bar code demodulation process in step S16 is good or bad. Then, if the result of the process is good, that is, if the four pieces of bar width data are converted into the corresponding data, in step S18, the internal RAM 16 is stored with the thus converted data, and the data corresponding to the entire bar code are synthesized based on pieces of data converted so far. The processing then proceeds to step S19. Contrastingly if the result of the process is bad, that is, if the four pieces of bar width data are not converted into the corresponding data, the processing proceeds directly to step S19.

Checked in step S19 is whether the bar code retrieval pointer passes over the address "448" of the internal RAM 16. Then, the processing is returned to step S16 till the bar code retrieval pointer passes over the address "448". If the bar code retrieval pointer passes over the address "448" of the internal RAM 16 as a result of repeating the loop process of the step S16 through step S19, the processing proceeds to step S20.

In step S20, 448 is added to the variable n.

Checked in next step S21 is whether a value of the present variable n is "1728". This is a check as to whether the processing is immediately after the completes of the DMA transfer (from the external RAM 13 to the internal RAM 16) of the fourth time. Then, if the value of the present variable n is not "1728", that is, if not immediately after the completion of the DMA transfer of the fourth time, whether the value of the present variable n exceeds "3072" is checked in step S24. This is a check as to whether the processing is immediately after the completion of the DMA transfer (from the external RAM 13 to the internal RAM 16) of the eighth time.

Then, if the processing is immediately after the completion of the DMA transfer of neither the fourth time nor the eighth time (if the processing is immediately after the DMA transfer of the second time, the third time, fifth–seventh times), the processing returns to step S13. In consequence, one of the DMA transfers of the third time, the fourth time and sixth–eighth times is executed.

In contrast with this, if immediately after completing the DMA transfer of the fourth time, it is checked in step S22 whether the DMA transfers of all the bar width data written at present in the external RAM 13 are completed. Then, if not completed, the processing returns to step S13 as in the case of being immediately after the DMA transfers of the second, third and fifth–7 seventh times. As a result, the DMA transfer of the fifth time is executed.

Figure 7:
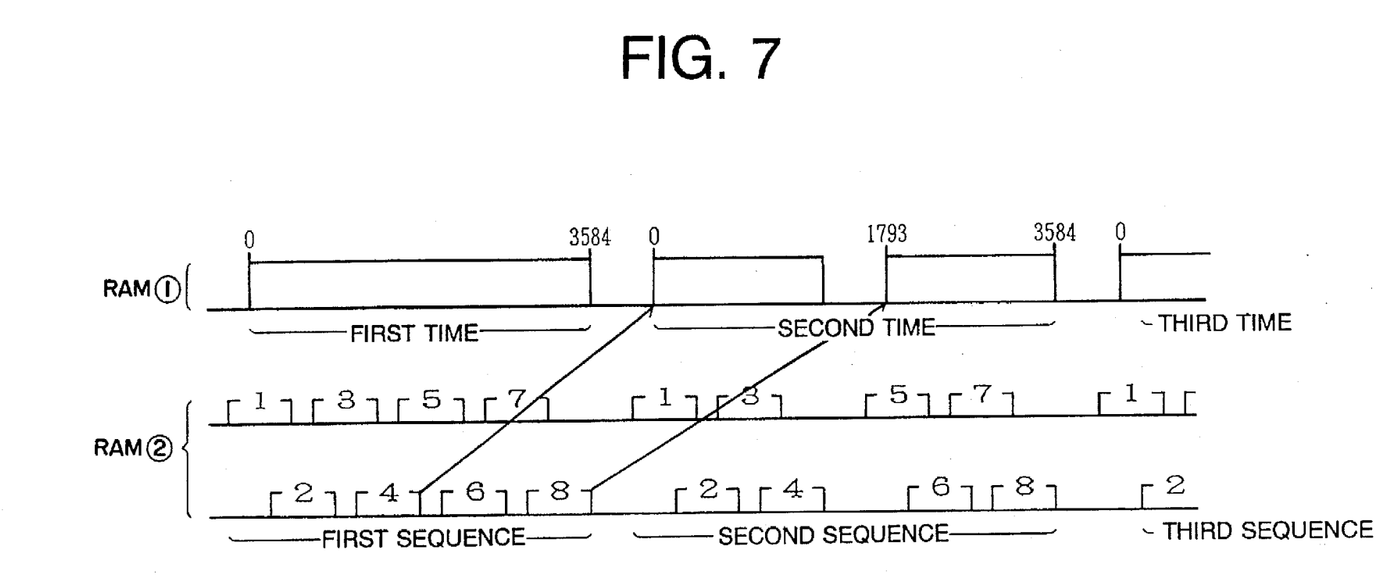
FIG. 7 is an explanatory diagram showing the DMA transfer.

Contrastingly if the DMA transfers of all the bar width data written at present in the external RAM 13 are completed, the DMA controller 15 starts DMA transfer for the bar width data of 1792 words from the bar width counter 11 to the external RAM 13 in the cycle still mode (which is a single address mode) in step S23 (see FIG. 7). Then, while the DMA controller 15 continues the DMA transfers till all the bar width data are transferred, it returns the processing to step S13. In consequence of this, the DMA transfer of the fifth time is executed.

In contrast with the above-mentioned, if the value of the present variable n exceeds "3072", the processing is just after the completion of the DMA transfer of the eighth time in the present sequence, and hence the processing returns to step S01, wherein the data transfer in the next sequence is carried out.

Then, as a result of the repetition of the above processes, the bar width counter 11 finishes generating the bar width data, and the transfer request signal (DREQ) disappears. In this case, the processes are terminated through step S01.
(Operation of Embodiment)

In accordance with the embodiment discussed above, as shown in FIG. 6, the bar width counter 11 performs the DMA-transfer of the bar width data set to the external RAM 13 on the unit of 3584 words at maximum on condition that the DMA controller 15 inputs the transfer request acceptance signal (DACK) to the bar width counter 11.

The DMA controller 15 carried out the DMA transfer to the internal RAM 16 from the external RAM 13 in parallel to the DMA transfer to the external RAM 13. The bar width data set of 3584 words, which has been DMA-transferred from the bar width counter 11 to the external RAM 13, is further DMA-transferred to the internal RAM 16 eight times (a plural number of times) separately. The reason for this is that the capacity of the internal RAM 16 is 1/8 times as large as the capacity of the external RAM 13.

Then, the quantity of the bar width data transferred through the DAM transfer (from the external RAM 13 to the internal RAM 16) of the first time is 448 words, while the quantity of the bar width data transferred through each of the DMA transfers after the first time is 512 words. Thus, the bar width data within the external RAM 13 is divided in the size smaller than the capacity (corresponding to 512 words) of the internal RAM 16 and transferred in whichever time. Then 64 words written to the area of the internal RAM 16 corresponding to addresses "448" through "512" (corresponding to the trail end part) in each time of DMA transfer are also written to the addresses "0" through "64" (corresponding to the head part) of the internal RAM 16 in the next time of DMA-transfer. That is, the DMA-transferred data in each time are overlapped on the 64-word unit.

Figure 8:
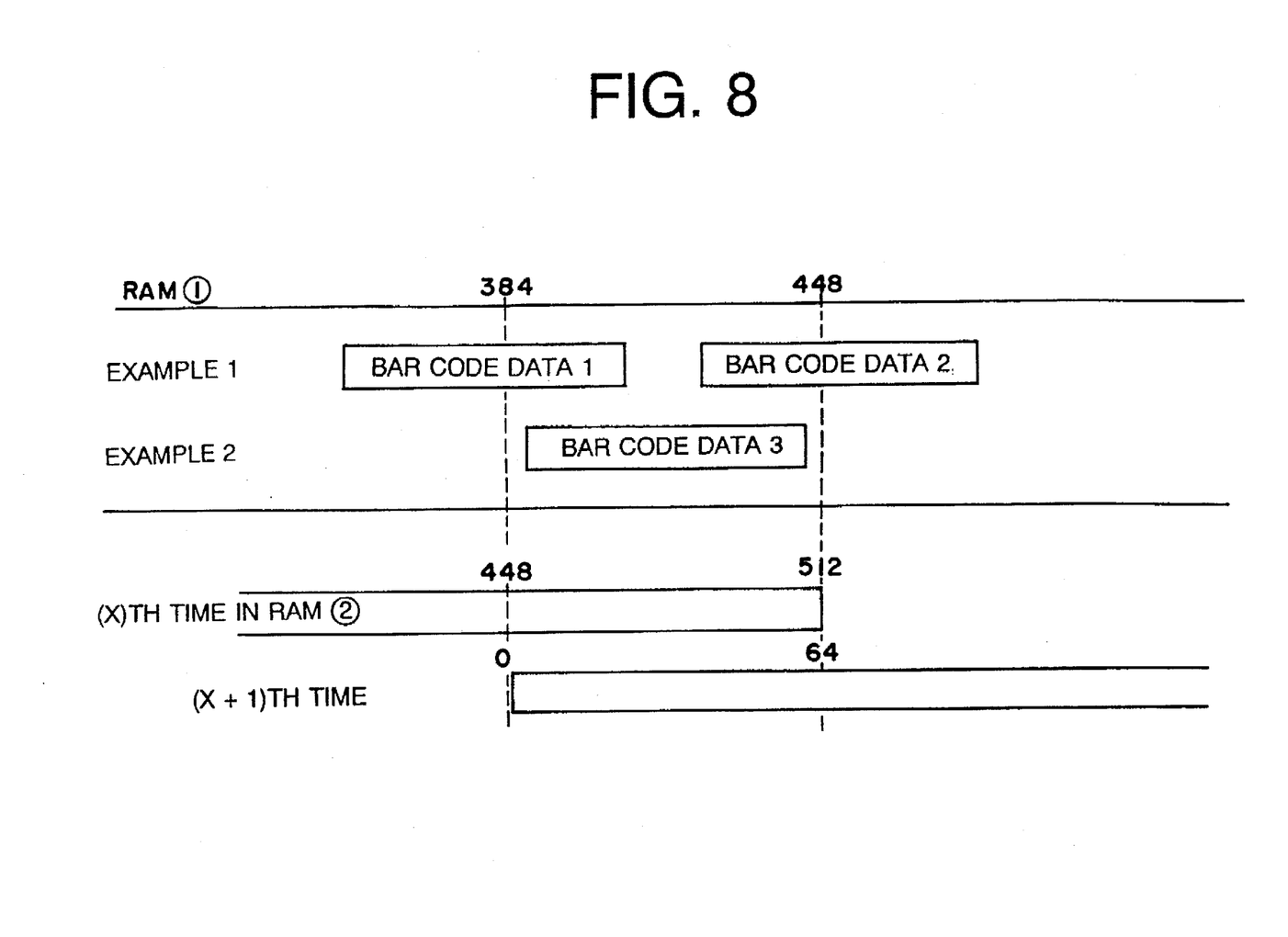
FIG. 8 is an explanatory diagram showing an overlapped portion of DMA transferred data.

Now, since the number of characters of the bar code data according to the WPC code is 13, the number of pieces of bar width data in the bar width data set, which are consecutively read without stopping from the head to the tail end of the WPC code, is 62. The one bar width data corresponds to one word. Accordingly, as shown in FIG. 8 (example 2), the bar width data set (which is the bar code 3) obtained by the one scanning process on the basis of the same bar code can be perfectly located within the overlapped portion of the DMA-transferred data of the respective times. As a matter of fact, however, it is rare that the bar width data set (which is the bar code 1 or the bar code 2) obtained by the one scanning process on the basis of the same bar code is located within the overlapped portion of the DMA-transferred data of the respective times. As illustrated in FIG. 8 (example 1), in many case, the bar width data set is come out any one DMA transfer data from its edge. Even in such a case, however, the bar width data set (which is the bar code 1 or the bar code 2) is located within the other DMA transfer data. Accordingly, the MPU 19 is capable of continuously demodulating and restoring this bar width data set (which is the bar code 1 or the bar code 2) into the corresponding data.

Figure 9:
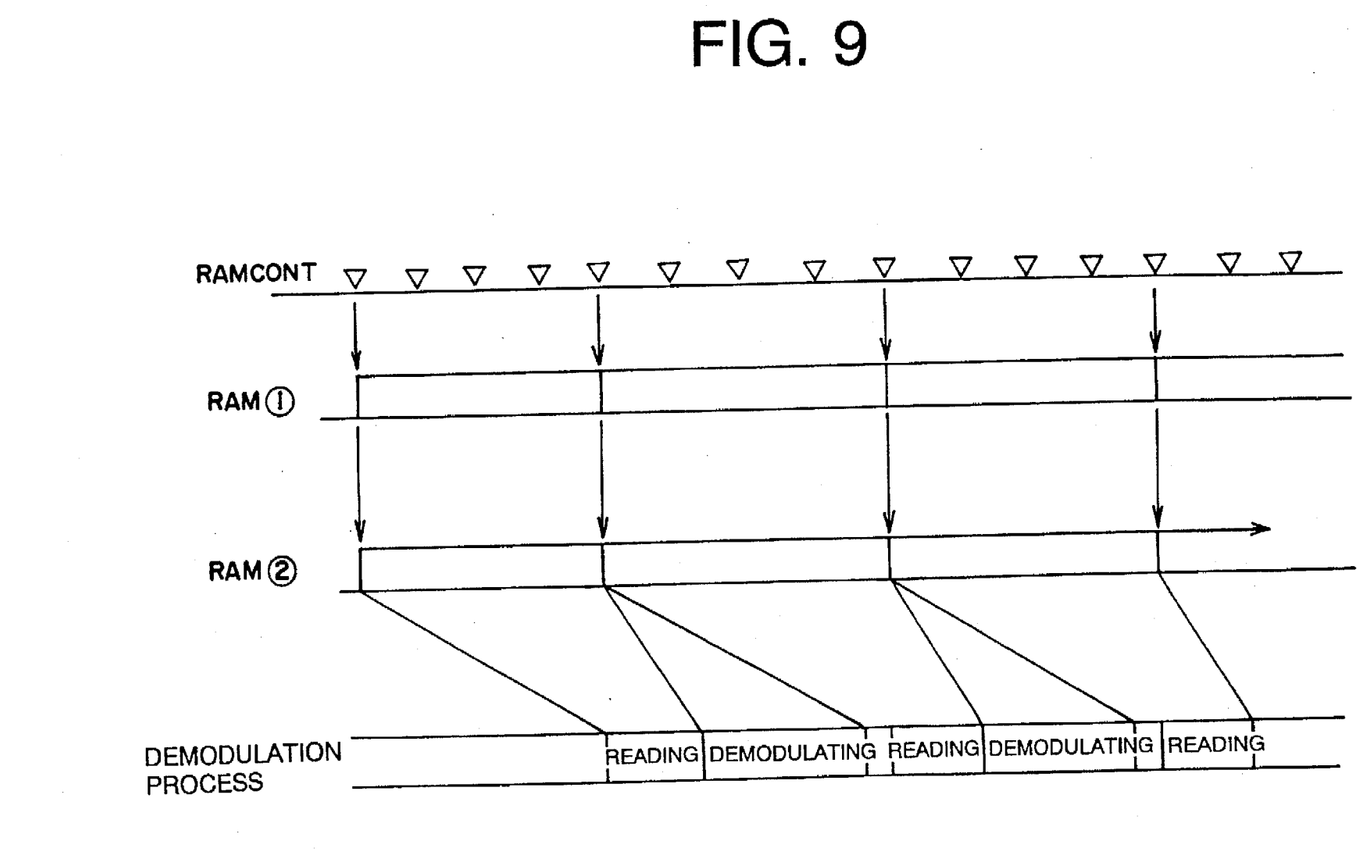
FIG. 9 is an explanatory diagram showing how the bar width data are prevented from being left due to a reading failure.

Note that the DMA transfer from the bar width counter 11 to the external RAM 13 and the DMA transfer from the external RAM 13 to the internal RAM 16 are carried out via the data bus DB, and therefore the transfer speed does not increase also in this embodiment. The MPU 19 reads the bar width data set from the internal RAM 16 at an extremely high speed. Hence, as shown in FIG. 9, a total time up to a completion of the demodulation process since the MPU 19 has read four pieces of bar width data may be smaller than a time for which the four pieces of bar width data are DMA-transferred from the external RAM 13 to the internal RAM 16.

Accordingly, it does not happen that the bar width data are left due to the reading failure when the bar width data are DMA-transferred from the external RAM 13 to the internal RAM 16 and when DMA-transferred from the internal RAM 16 to the MPU 19.

The thus constructed bar code reading apparatus according to the present invention is capable of demodulating the bar code without failing to taking the bar width data.

A wide range of different working modes can be formed based on the present invention without deviating from the spirit and scope of the present invention. The present invention, therefore, is not restricted by its specific working modes except being limited by the appended charges.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be restored to, falling within the scope of the invention.

What is claimed is:

1. A bar code reading apparatus comprising:
    bar width data generating means for detecting widths of respective bars of a bar code and generating bar width data corresponding to the widths of the respective bars;
    a low-speed memory to which the bar width data generated by said bar width data generating means are transferred;
    a high-speed memory to which the bar width data transferred to said low-speed memory are further transferred; and
    a demodulation device for reading the bar width data transferred to said high-speed memory and demodulating the bar width data into corresponding data.

2. A bar code reading apparatus according to claim 1, wherein said bar width data generating means, said low-speed memory and said high-speed memory are connected to each other via a data bus, and
    said high-speed memory is connected directly to said demodulation device.

3. A bar code reading apparatus according to claim 1, further comprising transfer control means for controlling the transfer of the bar width data from said bar width data generating means to said low-speed memory and the transfer from said low-speed memory to said high-speed memory.

4. A bar code reading apparatus according to claim 3, wherein said low-speed memory has a capacity larger than that of said high-speed memory.

5. A bar code reading apparatus according to claim 4, wherein said transfer control means divides plural pieces of bar width data stored in said low-speed memory into plural pieces in such a manner that a quantity of one piece of the divided data is smaller than a capacity of said high-speed memory, and transfers the plural pieces of the divided data to said high-speed memory through a plurality of transfer processes.

6. A bar code reading apparatus according to claim 5, wherein said transfer control means makes such an arrangement that a tail end part of the piece of the divided data to be transferred in each transfer process is included in a head of the piece of the divided data to be transferred in a next transfer process.

7. A bar code reading apparatus according to claim 6, wherein a quantity of the tail end part of the piece of the divided data to be transferred in each transfer process, which is included in the head of the piece of the divided data to be transferred in the next transfer process, is larger than a quantity of the bar width data corresponding to a segment from the leading end to the trailing end of a single bar code.

* * * * *